US011210984B2

(12) United States Patent
Adachi et al.

(10) Patent No.: US 11,210,984 B2
(45) Date of Patent: Dec. 28, 2021

(54) TIMING CONTROLLER AND DISPLAY DEVICE

(71) Applicant: SEIKO EPSON CORPORATION, Tokyo (JP)

(72) Inventors: Kentaro Adachi, Chino (JP); Chisato Higuchi, Fuchu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/800,223

(22) Filed: Feb. 25, 2020

(65) Prior Publication Data

US 2020/0273391 A1 Aug. 27, 2020

(30) Foreign Application Priority Data

Feb. 26, 2019 (JP) ............................ JP2019-032211

(51) Int. Cl.

| | |
|---|---|
| ***G06F 3/038*** | (2013.01) |
| ***G09G 5/00*** | (2006.01) |
| ***G09G 3/20*** | (2006.01) |

(52) U.S. Cl.

CPC ......... *G09G 3/20* (2013.01); *G09G 2310/027* (2013.01); *G09G 2310/0286* (2013.01); *G09G 2310/06* (2013.01); *G09G 2310/08* (2013.01)

(58) Field of Classification Search

CPC ..... G09G 2310/027; G09G 2310/0286; G09G 2310/06; G09G 2310/08; G09G 2370/08; G09G 3/20; G09G 5/006; G09G 5/18

See application file for complete search history.

(56) References Cited

U.S. PATENT DOCUMENTS

2016/0365066 A1* 12/2016 Lim ....................... G09G 3/006
2018/0047339 A1* 2/2018 Morita ................ G09G 3/2092
2018/0190171 A1 7/2018 Tashiro

FOREIGN PATENT DOCUMENTS

JP 5762330 B2 8/2015
JP 2018-109705 A 7/2018

* cited by examiner

*Primary Examiner* — Insa Sadio
(74) *Attorney, Agent, or Firm* — Oliff PLC

(57) ABSTRACT

A timing controller that controls a drive circuit of a display panel includes: a delay output unit configured to output a delay value based on a delay time of a second pulse with respect to a first pulse that is output by the drive circuit, the first pulse being generated in synchronization with a data signal supplied to the display panel; and an error output unit configured to compare the delay value and a threshold value to each other and output an error signal based on a result of the comparison, and the second pulse is a pulse that is output from the drive circuit based on the first pulse.

8 Claims, 6 Drawing Sheets

TIMING CONTROLLER AND DISPLAY DEVICE

The present application is based on, and claims priority from JP Application Serial Number 2019-032211, filed Feb. 26, 2019, the disclosure of which is hereby incorporated by reference herein in its entirety.

BACKGROUND

1. Technical Field

The present disclosure relates to a timing controller and a display device, for example.

2. Related Art

Display devices such as liquid crystal displays are commonly configured such that a display panel thereof has scan lines driven by a Y driver, and data lines driven by an X driver. Such display devices are also commonly configured to temporarily input video data generated by a host device to a circuit called a timing controller, and the timing controller then generates a timing signal necessary for driving the display panel, and a data signal obtained by converting the video data is supplied to the display panel in synchronization with the timing signal.

A technique in which a waveform of a start pulse, which is one timing signal, is deformed to reflect an abnormality in the signal to be inspected, and a determination is made based on the deformed signal is given as an example of a method of inspecting such a display device (see JP-A-2018-109705).

P-A-2018-109705 is an example of the related art.

However, with the technique described above, it is presumed that there is no abnormality in the transmission path of the start pulse. Therefore, a problem with the technique described above is that even if there is an abnormality in the transmission path of the start pulse, for example, the abnormality cannot be detected.

SUMMARY

A timing controller according to the present disclosure controls a drive circuit of a display panel, the timing controller including: a delay output unit configured to output a delay value based on a delay time of a second pulse with respect to a first pulse that is output by the drive circuit, the first pulse being generated in synchronization with a data signal supplied to the display panel; and an error output unit configured to compare the delay value and a threshold value to each other and output an error signal based on a result of the comparison, and the second pulse is a pulse that is output from the drive circuit based on the first pulse.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
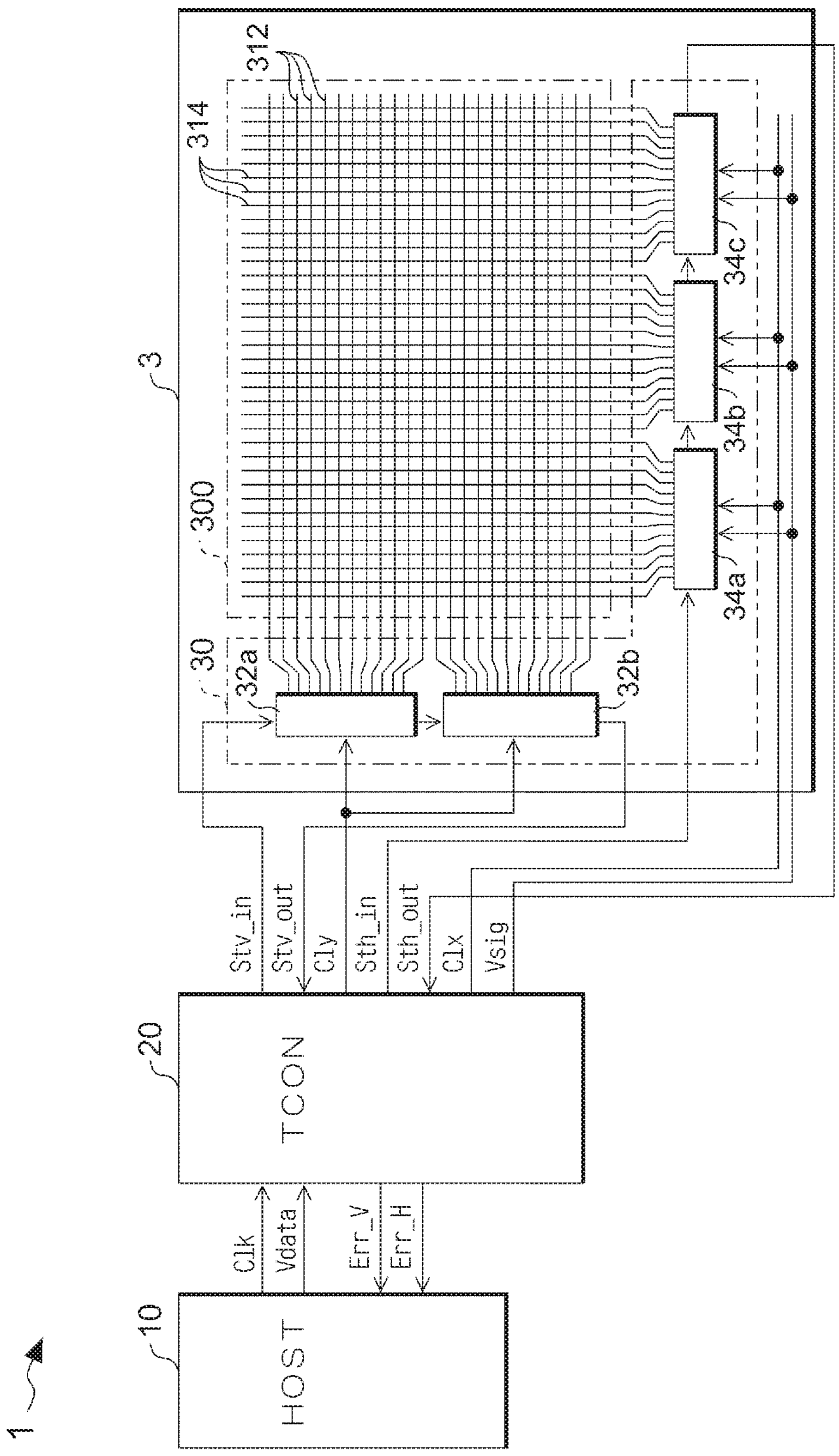
FIG. 1 is a diagram showing a configuration of a display device that includes a timing controller.

The following describes a timing controller according an embodiment with reference to the drawings. However, the size and scale of the components shown in the drawings are appropriately different to the size and scale of the actual components. Also, the embodiments in the following description are favorable specific examples of the present disclosure and therefore various technically favorable limitations are imposed. However, the scope of the present disclosure is not limited thereto, unless limitations to the present disclosure are specifically mentioned in the following description.

FIG. 1 is a diagram showing a configuration of a display device 1 that includes a timing controller 20 according to a first embodiment. As shown in FIG. 1, the display device 1 includes a host device 10, the timing controller 20, and a display panel 3. Note that, for the sake of simplicity, the drawings denote the host device 10 as "HOST", and denote the timing controller 20 as "TCON".

The host device 10 executes various types of arithmetic processing, control processing, and the like in accordance with a program, generates video data Vdata to be displayed on the display panel 3, and supplies the video data Vdata to the timing controller 20 in synchronization with a clock signal Clk. Note that the video data Vdata and the clock signal Clk may be supplied from the host device 10 to the timing controller 20 via LVDS, for example. LVDS is an acronym for Low Voltage Differential Signaling.

The timing controller 20 receives the video data Vdata and the clock signal Clk from the host device 10, generates a timing signal for driving the display panel 3, converts the received video data Vdata into an analog data signal Vsig, and supplies the data signal Vsig and the timing signal to the display panel 3 in synchronization with the generated timing signal.

Here, the timing signal is a signal used for vertically and horizontally scanning the display panel 3. Specifically, the timing signal may have a pulse Stv_in for designating the start of vertical scanning on the display panel 3, a clock signal Cly for transferring the pulse Stv_in, a pulse Sth_in for designating the start of horizontal scanning on the display panel 3, a clock signal Clx for transferring the pulse Sth_in, and the like.

Note that if the timing controller 20 detects an abnormality, which will be described later, error signals Err_V and Err_H are output at a H level to notify that an abnormality has occurred in the display panel 3 or the like.

The display panel 3 is provided with a plurality of scan lines 312 that run horizontally in the drawings, and a plurality of data lines 314 that run vertically in the drawings and are insulated from the scan lines 312. The display panel 3 is provided with liquid crystal display elements (not shown) in correspondence with where the scan lines 312 and the data lines 314 intersect with each other. The transmittance or reflectance of liquid crystal display elements changes according to a holding voltage as is well known, and therefore the liquid crystal display elements function as pixels. For this reason, the area in which the scan lines 312 and the data lines 314 intersect each other is the arrangement area of the pixels, that is, a display area 300.

The display panel 3 is provided with a drive circuit 30 outside of the display area 300. The drive circuit 30 is broadly divided into Y drivers 32*a* and 32*b*, and X drivers 34*a*, 34*b*, and 34*c*.

The Y drivers 32*a* and 32*b* include shift registers (not shown). If the display area 300 is hypothetically split in two in the up-down direction of FIG. 1, the Y driver 32*a* drives the scan lines 312 belonging to the upper area, and the Y driver 32*b* drives the scan lines 312 belonging to the lower area. The Y driver 32*a* sequentially shifts the pulse input in the initial stage of the shift register, based on the clock signal Cly, to supply the pulse as a scanning signal to the scan lines 312 belonging to the upper-half area, and outputs the pulse from the final stage of the shift register to the Y driver 32*b*. The Y driver 32*b* sequentially shifts the pulse output from the Y driver 32*b* to supply the pulse to the scan lines 312 belonging to the lower-half area, and outputs the pulse from the final stage of the shift register.

In the present embodiment, the pulse that is input in the initial stage of the shift register in the Y driver 32*a* is the pulse Stv_in from the timing controller 20, and the pulse that is output from the final stage of the shift register in the Y driver 32*b* is a pulse Stv_out.

The X drivers 34*a*, 34*b*, and 34*c* include shift registers and switches, and if the display area 300 in FIG. 1 is hypothetically split into three areas, namely a left area, a middle area, and a right area, the X driver 34*a* drives the data lines 314 belonging to the left area, the X driver 34*b* drives the data lines 314 belonging to the middle area, and the X driver 34*c* drives the data lines 314 belonging to the right area. The X driver 34*a* samples the data signal Vsig, in accordance with a signal obtained by sequentially shifting the pulse input in the initial stage of the shift register based on the clock signal Clx, supplies the sampled signal as a data signal to the data lines 314 in the left area, and outputs the pulse from the final stage of the shift register to the X driver 34*b*. The X driver 34*b* samples the data signal Vsig, in accordance with a signal obtained by sequentially shifting the pulse output from the X driver 34*a* based on the clock signal Clx, supplies the sampled signal as a data signal to the data lines 314 in the middle area, and outputs the pulse from the final stage of the shift register to the X driver 34*c*. The X driver 34*c* samples the data signal Vsig, in accordance with a signal obtained by sequentially shifting the pulse output from the X driver 34*b* based on the clock signal Clx, supplies the sampled signal as a data signal to the data lines 314 in the right area, and outputs the pulse from the final stage of the shift register.

In the present embodiment, the pulse input in the initial stage of the shift register in the X driver 34*a* is the pulse Sth_in from the timing controller 20, and the pulse output from the final stage of the shift register in the X driver 34*c* is the pulse Sth_out. Note that FIG. 1 shows an example in which the timing controller 20, the Y drivers 32*a* and 32*b*, and the X drivers 34*a*, 34*b*, and 34*c* are separate, but a configuration is also possible in which these components are formed as a monolithic integrated circuit.

Figure 2:
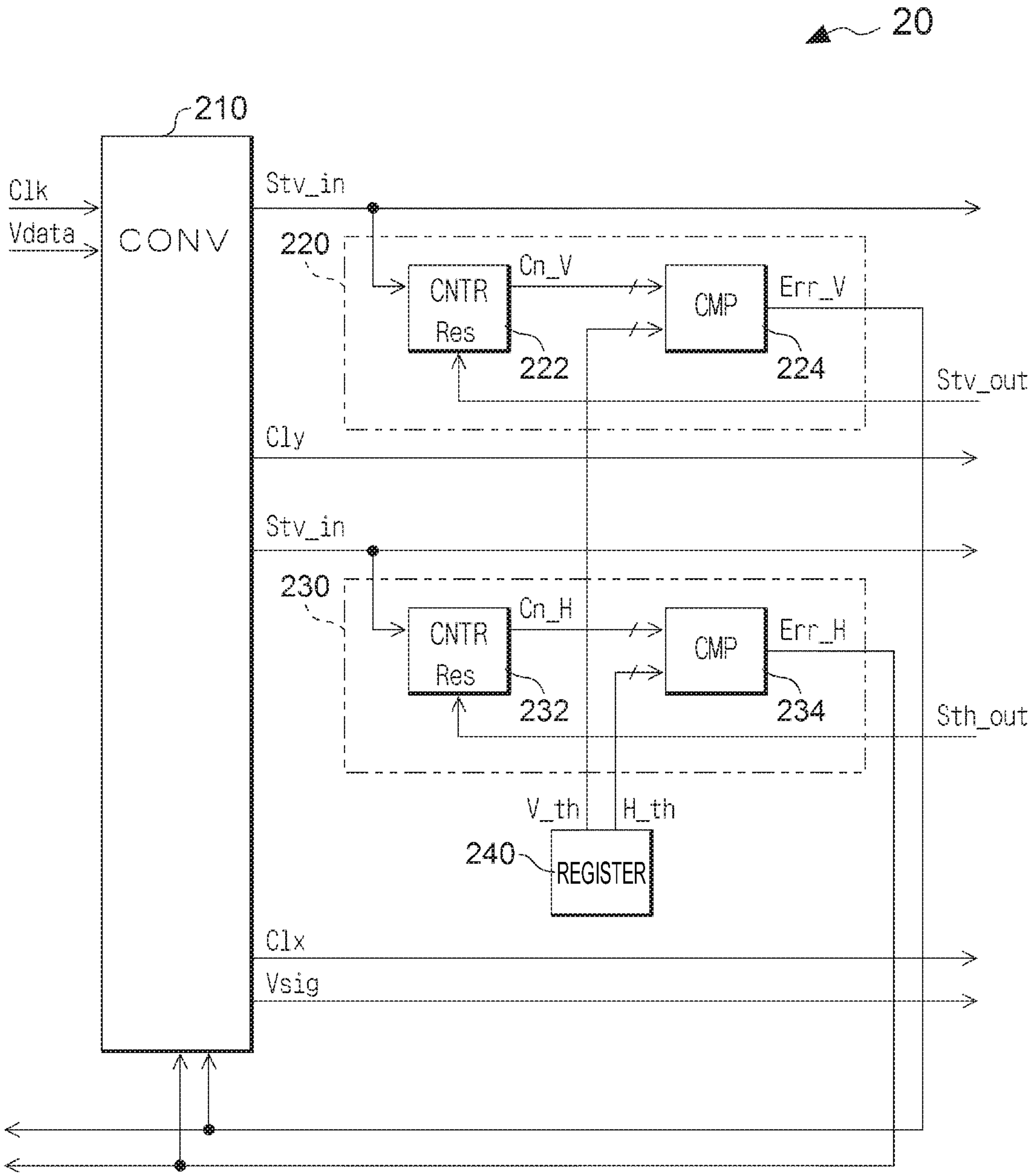
FIG. 2 is a block diagram showing a configuration of the timing controller.

FIG. 2 is a block diagram showing a configuration of the timing controller 20. As shown in FIG. 2, the timing controller 20 includes a conversion circuit 210 and inspection circuits 220 and 230. The inspection circuit 220 includes a counting circuit 222 and a comparison circuit 224, and the inspection circuit 230 includes a counting circuit 232 and a comparison circuit 234. Note that, for the sake of simplicity, the drawings denote the conversion circuit 210 as "CONV", denote the counting circuits 222 and 232 as "CNTR", and denote the comparison circuits 224 and 234 as "CMP".

The conversion circuit 210 converts the video data Vdata supplied from the host device 10 into the data signal Vsig, and generates the pulse Stv_in, the clock signal Cly, the pulse Sth_in, and the clock signal Clx, all of which are timing signals. Note that the conversion circuit 210 may also perform processing such as gamma correction, overdriving, or the like when converting the video data Vdata into the data signal Vsig.

In the inspection circuit 220, the counting circuit 222 counts up at the rising edge of the pulse Stv_in output from the conversion circuit 210, and outputs a count value Cn_V resulting from the counting up. The count value Cn_V from the counting circuit 222 is reset by the pulse Stv_out from the Y driver 32*b*. Also, the initial value of the count value Cn_V is zero.

Note that in the drawings, the counting circuit 222 directly inputs the pulse Stv_out, but a configuration is also possible in which the pulse Stv_out is fetched with an internal clock, and the count value Cn_V is reset by the fetched signal.

The comparison circuit 224 outputs the error signal Err_V at the H level if the count value Cn_V is larger than a value V_th that is read out from a register 240, and outputs the error signal Err_V at a L level if not.

In the inspection circuit 230, the counting circuit 232 counts up at the rising edge of the pulse Sth_in output from the conversion circuit 210, and outputs a count value Cn_H resulting from the counting up. The count value Cn_H from the counting circuit 232 is reset by the pulse Sth_out from the X driver 34*c*. Also, the initial value of the count value Cn_H is zero.

Note that in the drawings, the counting circuit 232 directly inputs the pulse Sth_out, but a configuration is also possible in which the pulse Stv_out fetched with an internal clock, and the count value Cn_H is reset by the fetched signal.

The comparison circuit 234 outputs the error signal Err_H at the H level if the count value Cn_H is larger than a value H_th that is read out from the register 240, and outputs the error signal Err_H at the L level if not.

Note that in the present embodiment, the counting circuits 222 and 232 count up at the rising edge of pulses, but configurations are also possible in which counting is performed at the falling edge of pulses, or in which counting down is performed rather than counting up.

The register 240 is a non-volatile memory such as an EEPROM, for example, and stores the values V_th and H_th. Here, EEPROM is an acronym for Electrically Erasable Programmable Read Only Memory.

Note that the values V_th and H_th from the register 240 may be, for example, read out by a control device (not shown), or latched by a circuit (not shown). Also, in the present embodiment, the values V_th and H_th that are stored in the register 240 can be rewritten by the control device described above. In the present embodiment, the value V_th may be "2", for example, and the value H_th may also be "2", for example. The meaning of the values V_th and H_th will be described later. Also, a configuration is possible in which the register 240 is external to the timing controller 20.

Figure 3:
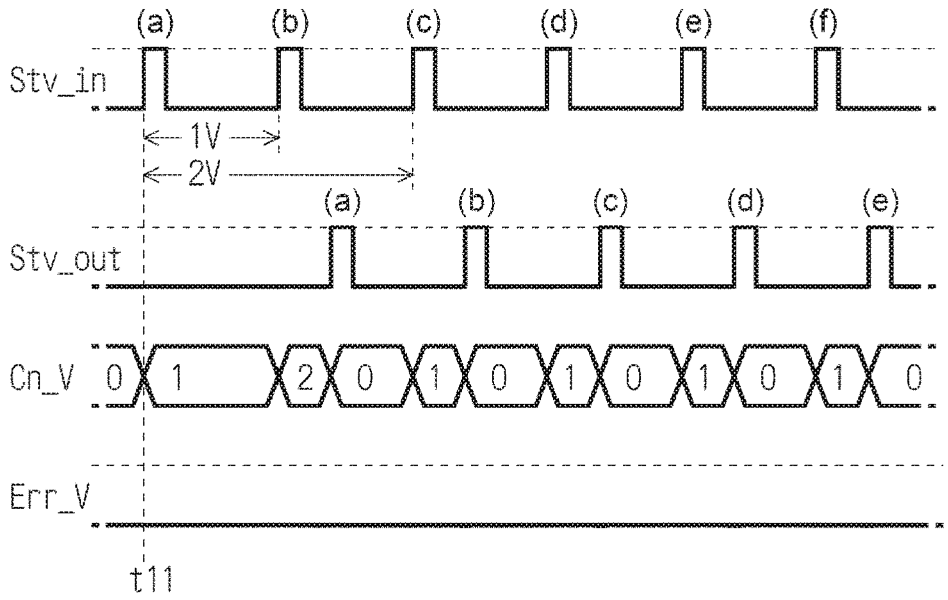
FIG. 3 is a diagram showing an inspecting operation of the timing controller.
Figure 4:
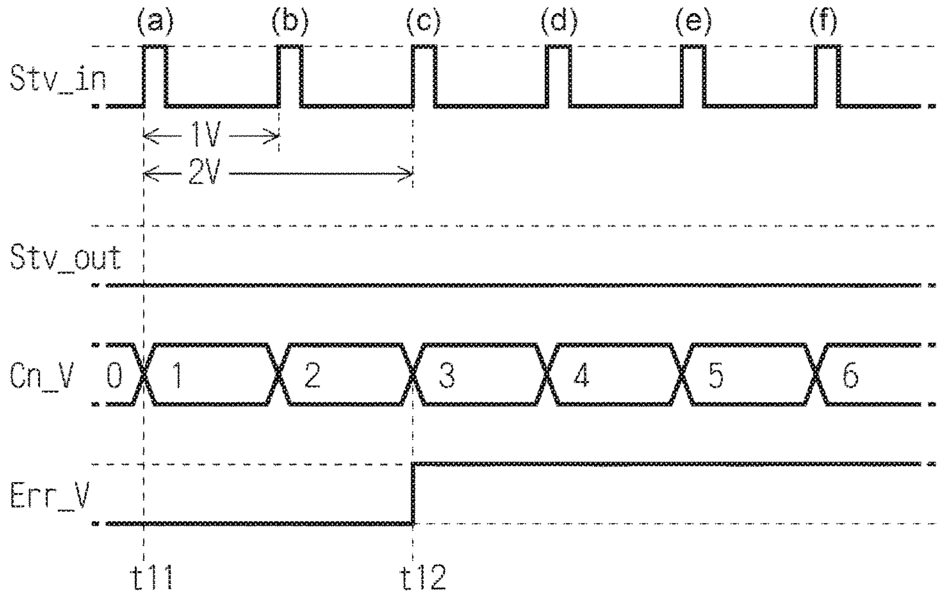
FIG. 4 is a diagram showing the inspection operation of the timing controller.

FIG. 3 and FIG. 4 are diagrams showing the vertical scanning inspection operation performed by the timing controller 20.

As shown in FIG. 3 or FIG. 4, the pulse Stv_in is output by the conversion circuit 210 at every one vertical scanning period 1V. If circuits, wires, and the like used for vertically scanning the display panel 3 are operating normally, the pulse Stv_in output from the conversion circuit 210 returns to the inspection circuit 220 as the pulse Stv_out after a certain period of time has passed.

The period from vertical scanning of the display panel 3 being started by the pulse Stv_in to the pulse Stv_out returning to the timing controller 20 substantially corresponds to one vertical scanning period 1V, but, in practice, delay exists due to the circuits, wires, and the like described above. For this reason, "a certain period of time" is, in practice, a period of time longer than or equal to one vertical scanning period 1V when the above-described delay is considered, and may be shorter than two vertical scanning periods 2V.

If the circuits, wires, and the like used for vertically scanning the display panel 3 are operating normally, as shown in FIG. 3, the pulse Stv_in that is output at a time t11 returns as the pulse Stv_out within two vertical scanning periods 2V. In this case, although the count value Cn_V is counted up by the pulse Stv_in, the count value Cn_V is reset by the pulse Stv_out and thus does not exceed "2". For this reason, normally, the error signal Err_V output from the comparison circuit 224 will be maintained at the L level.

If an abnormality such as disconnection occurs in the circuits, wires, and the like used for vertically scanning the display panel 3, as shown in FIG. 4, the pulse Stv_in output at the time t11 does not return as the pulse Stv_out within two vertical scanning periods 2V. In this case, the count value Cn_V is not reset by the pulse Stv_out and therefore continues to increase due to the pulse Stv_in being counted up. For this reason, the error signal Err_V will transition from the L level to the H level at a time t12 at which the count value Cn_V exceeds "2".

Figure 5:
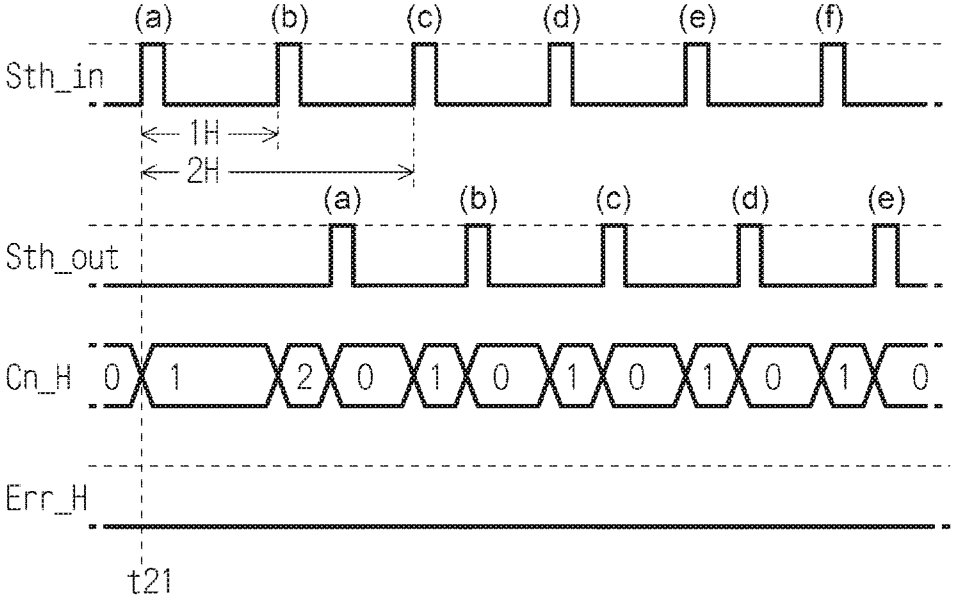
FIG. 5 is a diagram showing the inspection operation of the timing controller.
Figure 6:
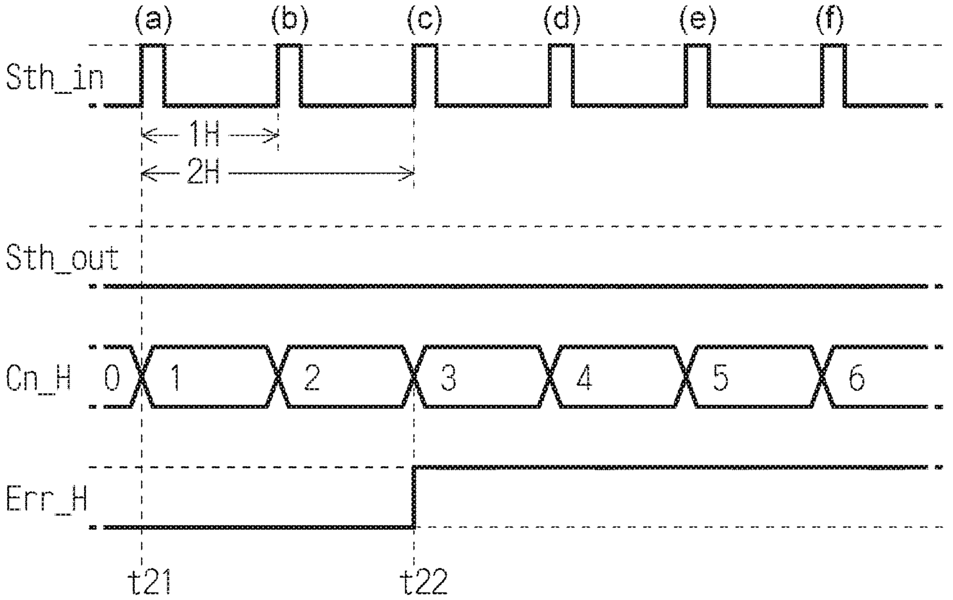
FIG. 6 is a diagram showing the inspection operation of the timing controller.

FIG. 5 and FIG. 6 are diagrams showing the horizontal scanning inspection operation performed by the timing controller 20.

Note that the horizontal scanning inspection operation is similar to the vertical scanning inspection operation except that the panels to be inspected are different.

As shown in FIG. 5 or FIG. 6, the timing controller 20 outputs the pulse Sth_in every one horizontal scanning period 1H. If the circuits, wires, and the like used for horizontally scanning the display panel 3 are operating normally, the pulse Sth_in output from the timing controller 20 returns to the timing controller 20 as the pulse Sth_out after a period of time that is different to the certain period of time described above has passed.

Note that the period from horizontal scanning of the display panel 3 being started by the pulse Sth_in to the pulse Sth_out returning to the timing controller 20 roughly corresponds to one horizontal scanning period 1H, but, in practice, delay exists due to the circuits, wires, and the like described above. For this reason, "the different period of time" is, in practice, a period of time that is longer than or equal to one horizontal scanning period 1H when the above-described delay is also considered, and may be less than two horizontal scanning periods 2H.

If the circuits, wires, and the like used for horizontally scanning the display panel 3 are operating normally, as shown in FIG. 5, the pulse Sth_in that is output at a time t21 returns as the pulse Sth_out within two horizontal scanning periods 2H. In this case, although the count value Cn_H is counted up by the pulse Sth_in, the count value Cn_H is reset by the pulse Sth_out, and thus does not exceed "2". For this reason, normally, the error signal Err_H output from the comparison circuit 224 will be maintained at the L level.

If an abnormality such as disconnection occurs in the circuits, wires, and the like used for horizontally scanning the display panel 3, as shown in FIG. 6, the pulse Sth_in that is output at the time t21, does not return as the pulse Sth_out within two horizontal scanning periods 2H. In this case, the count value Cn_H is not reset by the pulse Sth_out and therefore continues to increase due to the pulse Sth_in being counted up. For this reason, the error signal Err_H will transition from the L level to the H level at a time t22 at which the count value Cn_H exceeds "2".

Error processing will be executed if the error signal Err_V or the error signal Err_H becomes the H level. Specific examples of error processing include processing in which the conversion circuit 210 in the timing controller 20 stops generating a timing signal, processing in which the host device 10 stops outputting the video data Vdata, and processing that uses lighting of a warning lamp or audio to notify that an abnormality has occurred in the circuits, wires, or the like that are used for inspecting the display panel 3.

In the present embodiment, if the pulse Stv_in is taken as an example of a first pulse and the pulse Stv_out is taken as an example of a second pulse, the counting circuit 222 resets the count value Cn_V obtained by counting the pulse Stv_in with the pulse Stv_out, and therefore the count value Cn_V shows the delay time of the pulse Stv_out with respect to the pulse Stv_in. For this reason, the counting circuit 222 is an example of a delay output unit, and the comparison circuit 224 is an example of an error output unit because the comparison circuit 224 compares the count value Cn_V, which shows the delay time, to a threshold value V_th and outputs the error signal Err_V based on the result of the comparison. Also, in the present embodiment, if the pulse Sth_in is taken as an example of a first pulse and the pulse Sth_out is taken as an example of a second pulse, the counting circuit 232 resets the count value Cn_H of the counted pulse Sth_in with the pulse Sth_out, and therefore the count value Cn_H shows the delay time of the pulse Sth_out with respect to the pulse Sth_in. For this reason, the counting circuit 232 is an example of a delay output unit, and the comparison circuit 234 is an example of an error output unit because the comparison circuit 234 compares the count value Cn_H, which shows the delay time, to a threshold value H_th and outputs the error signal Err_H based on the result of the comparison.

With the present embodiment, if an abnormality occurs in the circuits, wires, or the like, used for horizontally or vertically scanning the display panel 3, the abnormality can be detected within two vertical scanning periods 2V or two horizontal scanning periods 2H from the start of the scanning. Thus, it is possible to promptly execute error processing.

In the first embodiment, abnormalities are detected in horizontal scanning and vertical scanning by the delay of the pulse Stv_out with respect to the pulse Stv_in, or the delay of the pulse Sth_out with respect to the pulse Sth_in, exceeding a threshold value. This detection can also be described as follows.

In other words, if (a), (b), and (c) of the pulse Stv_in are output in chronological order as shown in FIG. 3, the timing controller 20 will detect normal operation if (a) of the pulse Stv_out is input before (c) of the pulse Stv_in is output. On the other hand, as shown in FIG. 4, even if (c) of the pulse Stv_in is output, the timing controller 20 will detect an abnormality if the pulse Stv_out is not input. Similarly, if (a), (b), and (c) of the pulse Sth_in are output in chronological order as shown in FIG. 5, the timing controller 20 will detect normal operation if (a) of the pulse Sth_out is input before (c) of the pulse Sth_in is output. On the other hand, as shown in FIG. 6, even if (c) of the pulse Sth_in is output, the timing controller 20 will detect an abnormality if the pulse Sth_out is not input.

Also, in the first embodiment, the count value Cn_V is reset by the pulse Stv_out, and therefore even if the vertical scanning is normal up to a given point in time, if an abnormality occurs in the vertical scanning during display, the abnormality can be detected within two vertical scanning periods 2V from the abnormality occurring. This detection can also be described as follows.

In other words, if (a), (b), (c) and so on of the pulse Stv_in are output in chronological order as shown in FIG. 3, the timing controller 20 will detect normal operation if (a), (b), (c) and so on of the pulse Stv_in are input with a delay within two vertical scanning periods 2V. On the other hand, in this case, an abnormality will be detected if any one of (a), (b), (c) and so on of the pulse Stv_out is missing, even with a delay within two vertical scanning periods 2V.

Similarly, in the first embodiment, the count value Cn_H is reset by the pulse Sth_out, and therefore even if the horizontal scanning is normal up to a given point in time, if an abnormality occurs in the horizontal scanning during display, the abnormality can be detected within two horizontal scanning periods 2H from the abnormality occurring. This detection can also be described as follows.

In other words, if (a), (b), (c) and so on of the pulse Sth_in are output in chronological order as shown in FIG. 5, the timing controller 20 will detect normal operation if (a), (b), (c) and so on of the pulse Sth_in are input with a delay within two horizontal scanning periods 2H. On the other hand, in this case, an abnormality will be detected if any one of (a), (b), (c) and so on of the pulse Sth_out is missing, even with a delay within two horizontal scanning periods 2H.

Note that in the present embodiment, the pulse Stv_in and the pulse Sth_in are described as an example of first pulses, but a synchronization signal that is synchronized with the data signal Vsig may also be given as an example of a first pulse. For example, a configuration is also possible in which the timing controller 20 outputs the synchronization signal that is synchronized with the data signal Vsig to the X driver 34*a* as an example of the first pulse, and inputs the pulse that is output from the X driver 34*c* as the pulse Stv_out, which is an example of the second pulse. With this configuration, the X driver 34 generates a start pulse that corresponds to the pulse Stv_in based on the synchronization signal, and the start pulse is supplied to the X drivers 34*b* and 34*c*.

The following describes the timing controller 20 according to a second embodiment.

Figure 7:
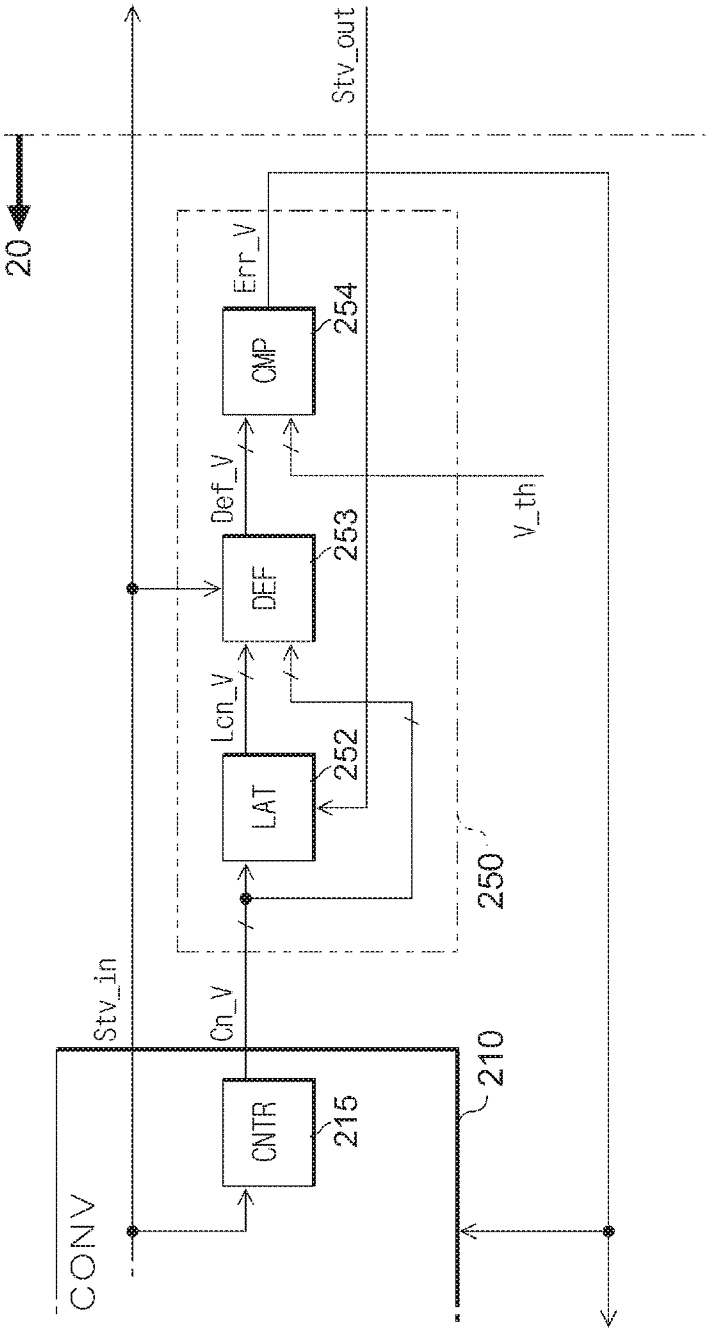
FIG. 7 is a block diagram showing a configuration of a main section of the timing controller.

FIG. 7 is a diagram showing a main section of the timing controller 20 according to the second embodiment. In FIG. 7, the timing controller 20 includes an inspection circuit 250, and the conversion circuit 210 includes a counting circuit 215.

Similar to the counting circuit 222 shown in FIG. 2, a counting circuit 215 counts up at the rising edge of the pulse Stv_in, and outputs a count value Cn_V resulting from the counting up. However, the counting circuit 215 is different to the counting circuit 222 in that the count value Cn_V is not reset by the pulse Stv_out from an initial value of zero. Note that a general-purpose counter that is included in the conversion circuit 210 can be used as the counting circuit 215.

In the inspection circuit 250, a latch circuit 252 latches the count value Cn_V output from the counting circuit 215 by the rising edge of the pulse Stv_out from the Y driver 32*b*, and a count value Lcn_V, which is the result of the latching, is output.

At the timing of the rising edge of the pulse Stv_in, a differential circuit 253 outputs a value Def_V obtained by subtracting the count value Lcn_V from the count value Cn_V.

A comparison circuit 254 outputs the error signal Err_V at the H level if the value Def_V is larger than the threshold value V_th, and outputs the error signal Err_V at the L level if not.

Note that the timing controller 20 is provided with a circuit corresponding to the inspection circuit 230 in FIG. 2, that is to say, a circuit for inspecting horizontal scanning, but this circuit is not shown in the drawings. Also, in FIG. 7, the latch circuit 252 is denoted as "LAT", and the differential circuit 253 is denoted as "DEF".

Figure 8:
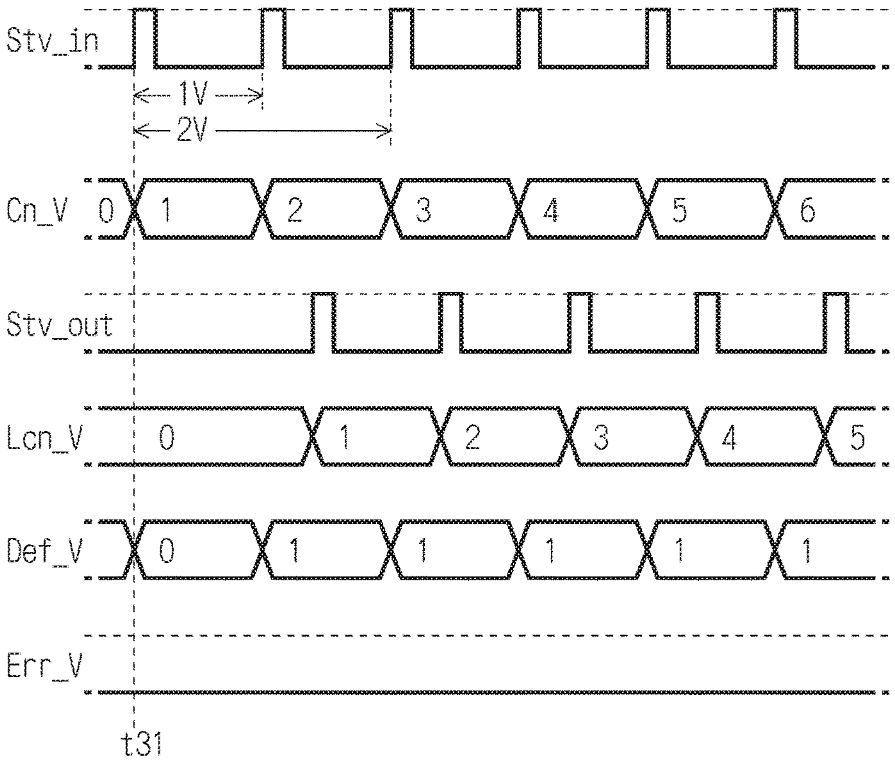
FIG. 8 is a diagram showing the inspection operation of the timing controller.
Figure 9:
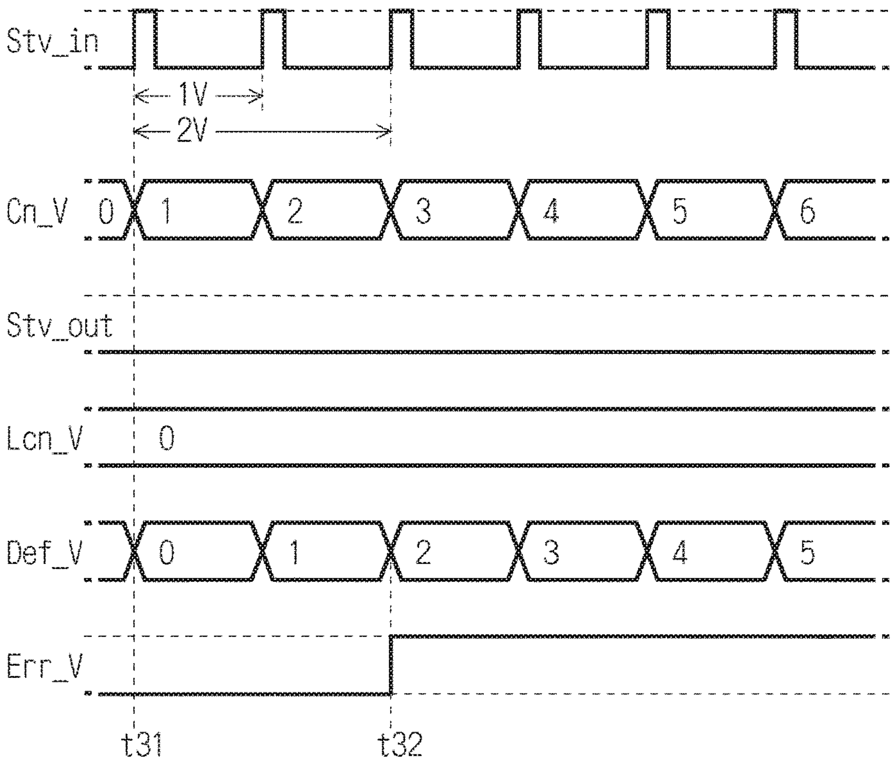
FIG. 9 is a diagram showing the inspection operation of the timing controller.

FIG. 8 and FIG. 9 are diagrams showing the vertical scanning inspection operation performed by the inspection circuit 250.

As shown in FIG. 8 and FIG. 9, a pulse Stv_in is output for each of one vertical scanning period 1V. If the circuits, wires, and the like used for vertically scanning the display panel 3 are operating normally, the pulse Stv_in returns to the inspection circuit 250 as the pulse Stv_out after a certain amount of time has passed.

If the circuits, wires, and the like used for vertically scanning the display panel 3 are operating normally, as shown in FIG. 8, the pulse Stv_in that is output at a time t31 returns as the pulse Stv_out within two vertical scanning periods 2V. In this case, the count value Cn_V is counted up at the rising edge of the pulse Stv_in by a counting circuit 251, the count value Cn_V is latched by the rising edge of the pulse Stv_out by the latch circuit 252, and output as the count value Lcn_V. For this reason, the value Def_V obtained by subtracting the count value Lcn_V from the count value Cn_V indicates the delay time of the pulse Stv_out with respect to the pulse Stv_in. In this case, the value Def_V does not exceed "2", and therefore the error signal Err_V output from the comparison circuit 254 is maintained at the L level.

If an abnormality such as disconnection occurs in the circuits, wires, and the like used for vertically scanning the display panel 3, as shown in FIG. 9, the pulse Stv_in output at the time t31 does not return as the pulse Stv_out within two vertical scanning periods 2V. In this case the latch circuit 252 cannot latch the count value Cn_V, and therefore the count value Lcn_V is not changed from the initial value of zero. For this reason, the value Def_V output by the differential circuit 253 tracks the increase of the value Def_V, and continues to increase. For this reason, the error signal Err_V will transition from the L level to the H level at a time t32 in which the value Def_V has exceeded "2".

Note that a circuit (not shown) corresponding to the inspection circuit 230 is only different in terms of vertical scanning and horizontal scanning.

In the second embodiment, if the pulse Stv_in is taken as an example of a first pulse and the pulse Stv_out is taken as an example of a second pulse, the value Def_V obtained by subtracting the count value Lcn_V from the count value Cn_V indicates the delay time of the pulse Stv_out with respect to the pulse Stv_in. For this reason, the differential circuit 253 is an example of a delay output unit, and the comparison circuit 254 is an example of an error output unit because the comparison circuit 254 compares the value Def_V, which shows the delay time, to the threshold value V_th and outputs the error signal Err_V based on the result of the comparison.

Note that if the pulse Stv_in is swapped with the pulse Sth_in and the pulse Stv_out is swapped with the pulse Sth_out, similarly, it is possible to detect an abnormality such as disconnection in the circuits, wires, and the like used for horizontally scanning the display panel 3.

With the second embodiment, similar to the first embodiment, if an abnormality occurs the circuits, wires, or the like used for vertically or horizontally scanning the display panel 3, the abnormality can be detected within two vertical scanning periods 2V or two horizontal scanning periods 2H. Thus, it is possible to promptly execute error processing.

With the second embodiment also, in comparison to the first embodiment, there is no need to newly provide the inspection circuit 250 with the counting circuit 215 that counts the pulse Stv_in, and therefore it is possible to simplify the timing controller 20.

Note that the first and second embodiments employ a so-called dot sequential configuration in which the X drivers 34*a*, 34*b*, and 34*c* sample the data signal Vsig, in accordance with a signal obtained by sequentially shifting the pulse Sth_in based on the clock signal Clx, and supply the sampled signal as a data signal to the data lines 314. There is no limitation to this, and a so-called phase expansion configuration is also possible in which the data signal Vsig is split into a plurality of channels, and each channel is supplied with a data signal.

Also, in the present configuration, vertically scanning the display panel 3 is performed with two Y drivers 32*a* and 32*b*, and horizontally scanning the display panel 3 is performed with three X drivers 34*a*, 34*b*, and 34*c*, but a configuration is also possible in which one, or a plurality of drivers are provided for vertical scanning or horizontal scanning.

The display panel 3 is not limited to a liquid crystal panel that uses liquid crystal display elements for pixels, and an organic light-emitting panel that uses organic light emitting elements may also be used as the display panel 3.

What is claimed is:

1. A timing controller that controls a drive circuit of a display panel, the timing controller comprising:

a delay output unit configured to output a delay value between a time when a second pulse that is output from the drive circuit based on a first pulse and a time when the first pulse is output to the drive circuit, the delay value being determined based on a delay time of the second pulse with respect to the first pulse, the first pulse being generated in synchronization with a data signal supplied to the display panel; and an error output unit configured to compare the delay value and a threshold value and output an error signal based on a result of the comparison.

2. The timing controller according to claim 1, wherein the second pulse is a pulse that is obtained by the first pulse being transferred by the drive circuit.

3. The timing controller according to claim 1, wherein the delay output unit is a counting circuit configured to use the second pulse to reset a count value obtained by counting the first pulse, and the error output unit is a comparison circuit configured to compare the count value and the threshold value.

4. The timing controller according to claim 1, wherein the delay output unit includes:

a latch circuit configured to latch a count value of the first pulse with the second pulse; and a differential circuit configured to output a differential value of an output of the latch circuit and the count value, and the error output unit is a comparison circuit configured to compare the differential value and the threshold value.

5. The timing controller according to claim 1, wherein the display panel includes a plurality of scan lines, the first pulse is a signal that designates starting vertical scanning by the drive circuit, and the drive circuit is configured to drive the plurality of scan lines based on a signal obtained by sequentially transferring the first pulse.

6. The timing controller according to claim 1, wherein the display panel includes a plurality of data lines, the first pulse is a signal that designates starting horizontal scanning by the drive circuit, and the drive circuit is configured to drive the plurality of data lines based on a signal obtained by sequentially transferring the first pulse.

7. The timing controller according to claim 1, wherein the threshold value is changeable.

8. A display device, comprising:

the timing controller according to claim 1; and the display panel including the drive circuit.

* * * * *